(12) United States Patent
Akita et al.

(10) Patent No.: US 8,596,870 B2
(45) Date of Patent: Dec. 3, 2013

(54) BEARING DEVICE

(75) Inventors: Hideki Akita, Tsuchiura (JP); Osamu Gokita, Tsukuba (JP); Akiko Sato, Tsuchiura (JP); Eiji Negoro, Gojo (JP); Tomiyoshi Yamazaki, Shinshiro (JP)

(73) Assignees: Hitachi Construction Machinery Co., Ltd., Tokyo (JP); Nippon Valqua Industries, Ltd., Tokyo (JP)

( * ) Notice: Subject to any disclaimer, the term of this patent is extended or adjusted under 35 U.S.C. 154(b) by 470 days.

(21) Appl. No.: 12/863,260

(22) PCT Filed: Mar. 26, 2009

(86) PCT No.: PCT/JP2009/056150
§ 371 (c)(1),
(2), (4) Date: Jul. 30, 2010

(87) PCT Pub. No.: WO2009/128331
PCT Pub. Date: Oct. 22, 2009

(65) Prior Publication Data
US 2011/0019949 A1 Jan. 27, 2011

(30) Foreign Application Priority Data
Apr. 14, 2008 (JP) ................................ 2008-104767

(51) Int. Cl.
*F16C 33/74* (2006.01)
*F16J 15/32* (2006.01)

(52) U.S. Cl.
USPC ............................ 384/140; 384/147; 277/562

(58) Field of Classification Search
USPC ........... 384/130, 139, 140, 143, 147; 277/562
See application file for complete search history.

(56) References Cited

U.S. PATENT DOCUMENTS

| | | | | |
|---|---|---|---|---|
| 3,013,826 | A | * 12/1961 | Sharp | 277/529 |
| 6,783,129 | B2 | * 8/2004 | Akita et al. | 277/349 |
| 8,123,229 | B2 | * 2/2012 | Eguchi | 277/558 |
| 2003/0102635 | A1 | 6/2003 | Akita et al. | |
| 2004/0086212 | A1 | 5/2004 | Ohtsuki et al. | |

FOREIGN PATENT DOCUMENTS

| | | |
|---|---|---|
| EP | 1 281 882 A1 | 2/2003 |
| JP | 3-108932 U | 11/1991 |
| JP | 2001-116054 A | 4/2001 |
| JP | 2001-215132 A | 8/2001 |
| JP | 2003-240000 A | 8/2003 |
| JP | 2006-90400 A | 4/2006 |
| WO | 02/073053 A1 | 9/2002 |
| WO | WO2007066503 | * 6/2007 |

* cited by examiner

Primary Examiner — James Pilkington
(74) Attorney, Agent, or Firm — Mattingly & Malur, PC

(57) ABSTRACT

A dust seal is provided with a tubular fitting portion, a bush end surface abutting portion, a lip portion and a sealing projection integrally formed. The sealing projection is formed to project in an axially opposite direction to the lip portion from a radial inner section of the bush end surface abutting portion and abuts against a chamfered portion of a bush in such a manner as to overlap the chamfered portion. Therefore, at the time of supplying lubricant between the bush and a connecting pin, the sealing projection can prevent a part of the lubricant from entering between an end surface of the bush and the bush end surface abutting portion of the dust seal to maintain a sealed state therebetween. In consequence, the dust seal can be stably held on the inner peripheral side of a boss member, preventing the pulling-out of the dust seal.

9 Claims, 6 Drawing Sheets

US 8,596,870 B2

BEARING DEVICE

TECHNICAL FIELD

The present invention relates to a bearing device suitable for a pin connecting portion or the like in a working mechanism equipped in a construction machine such as a hydraulic excavator, and particularly to a bearing device comprising a dust seal for suppressing foreign objects from entering into the bearing device from an outside.

BACKGROUND ART

Generally, a construction machine such as a hydraulic excavator is equipped with, for example, a working mechanism comprising a boom, an arm and a bucket at a front portion of a vehicle body for performing a ground excavating operation of earth and sand or the like, and bearing devices are provided between the boom and the arm in the working mechanism, between the arm and the bucket therein and the like for rotatably connecting both of them.

The bearing device of this type according to the conventional art comprises a tubular boss member provided in one of the boom, the arm and the bucket and having a bush fitting bore at an inner peripheral side thereof, a bush provided to be fitted in the bush fitting bore of the boss member, a connecting pin inserted through an inner peripheral side of the bush to rotatably connect the boss member to an opponent member, and dust seals provided between the boss member and the connecting pin to be positioned at both of axial end sides of the bush (Patent Literature 1: Japanese Patent Laid-Open No. 2006-90400 A).

In this case, the dust seal is disposed between an inner peripheral surface of the boss member and an outer peripheral surface of the connecting pin, and, for example, serves to suppress foreign objects (dusts, rain water and the like) from entering into a sliding surface between the connecting pin and the bush from an outside. Namely, the dust seal is composed of a tubular fitting portion fitted on the inner peripheral side of the boss member with an interference, a bush end surface abutting portion extending radially inward from an end portion of the tubular fitting portion to abut against an axial end surface of the bush in a state of surface contact, and a lip portion extending to be inclined obliquely inward in an opposite direction to the bush from a radial inner section of the bush end surface abutting portion and having a tip end side in sliding contact with the outer peripheral surface of the connecting pin.

The dust seal is firmly mounted to the boss member by inserting and fitting the tubular fitting portion on the inner peripheral side of the boss member, and the lip portion is resiliently in sliding contact with the outer peripheral surface of the connecting pin in this inserting and fitting state. This dust seal prevents the foreign objects from entering into the sliding portion between the bush and the connecting pin from an outside. In addition, the lip portion of the dust seal serves as a valve for uniformly filling lubricant such as grease inside the bush at the time of supplying the lubricant to the sliding portion.

In the aforementioned conventional art, the bush end surface abutting portion of the dust seal is abutted against the axial end surface of the bush. However, the bush end surface abutting portion is simply in contact with the end surface of the bush. Therefore, there are some cases where a part of the lubricant such as grease supplied between the bush and the connecting pin flows out (leaks) into a region between the bush end surface abutting portion of the dust seal and the end surface of the bush.

When the lubricant flows thus out to the bush end surface abutting portion side of the dust seal from a region between the bush and the connecting pin, this lubricant enters between the end surface of the bush and the bush end surface abutting portion and serves to press the entire dust seal toward an axial outside of the boss member (bush fitting bore) by a pressing force thereof. Therefore, the pressing force of the lubricant possibly causes the dust seal to leave away from the end surface of the bush and be pulled out to an opponent member side.

On the other hand, in the aforementioned conventional art according to Patent Literature 1, for preventing this pulling-out of the dust seal, a pulling-out preventive portion of a convex shape is provided at the outer peripheral side of the tubular fitting portion. However, when the pulling-out preventive portion of a convex shape is formed at the outer peripheral side of the tubular fitting portion, for example, extra labors are required for a molding operation and an extraction operation of the dust seal using a mold tool, raising a problem of degradation in operability upon molding and processing the dust seal. Further, since the fitting force becomes uneven caused by the pulling-out preventive portion of a convex shape, the sealing force is also possibly uneven.

Further, even in a case of adding such pulling-out preventive portion to the tubular fitting portion of the dust seal, the dust seal may be pushed and moved in a direction of leaving away from the end surface of the bush, that is, toward an opponent member side by a pressing force of the lubricant entering into the bush end surface abutting portion side, raising a problem that the pulling-out preventive effect of the dust seal cannot be sufficiently expected.

DISCLOSURE OF THE INVENTION

In view of the above-discussed problems with the conventional art, it is an object of the present invention to provide a bearing device which can suppress a part of lubricant supplied between a bush and a connecting pin to enter between an axial end surface of the bush and a dust seal, thereby stably holding the dust seal on an inner peripheral side of a boss member and preventing the pulling-out of the dust seal by the lubricating agent supplying pressure.

(1) To overcome the above-discussed problems, the present invention is applied to a bearing device which comprises a tubular boss member, a bush provided to be fitted on an inner peripheral side of the boss member, a connecting pin inserted on an inner peripheral side of the bush to rotatably connect the boss member to an opponent member, and dust seals disposed between the boss member and the connecting pin to be positioned at both of axial end sides of the bush, wherein a tapered chamfered portion is formed in an axial end portion of the bush to be positioned at the inner peripheral side, serving as a guide surface in case of inserting the connecting pin into the bush.

A characteristic feature of the present invention lies in that the dust seal is composed of a tubular fitting portion fitted on the inner peripheral side of the boss member with an interference, a bush end surface abutting portion extending radially inward from an end portion of the tubular fitting portion to abut against an axial end surface of the bush in a state of surface contact, a lip portion extending to be inclined obliquely inward at an opposite side in an axial direction to the bush from a radial inner section of the bush end surface abutting portion and having a tip end side in sliding contact with an outer peripheral surface of the connecting pin, and a sealing projection projecting in an axially opposite direction to the lip portion from the radial inner section of the bush end surface abutting portion to abut against the chamfered portion of the bush in such a manner as to overlap the chamfered portion, and the sealing projection suppresses lubricant to enter between the axial end surface of the bush and the bush end surface abutting portion of the dust seal to apply an axial pressing force to the dust seal.

According to the present invention, at the time of supplying the lubricant such as grease between the bush and the connecting pin from the outside, the sealing projection of the dust seal prevents the part of the lubricant leaked from the axial end surface side of the bush from entering between the bush end surface abutting portion of the dust seal and the end surface of the bush. As a result, a sealed state between the end surface of the bush and the bush end surface abutting portion of the dust seal can be maintained by the sealing projection.

Therefore, the sealing projection of the dust seal can suppress the pressing force of the lubricant supplied from the outside to operate between the axial end surface of the bush and the bush end surface abutting portion of the dust seal to hold the dust seal in a stable posture at the inner peripheral side of the boss member and also prevent the pulling-out of the dust seal by the pressing force. In addition, it is not necessary to add a special pulling-out preventive portion or the like on the outer peripheral side of the tubular fitting portion as in the case of the conventional art, and therefore molding and processing of the dust seal can be facilitated to achieve an improvement on productivity, a reduction in manufacturing cost and the like.

(2) According to the present invention, the chamfered portion of the bush is formed of a tapered surface inclined at a predetermined angle ($\alpha$) and the sealing projection of the dust seal overlaps the tapered surface in a state where a tip end of the sealing projection is in contact with the tapered surface.

With this configuration, the tip end side of the sealing projection in the dust seal can abut against the tapered surface of the chamfered portion as a so-called lip to maintain an abutting surface between the both to be in a sealed state. Therefore, the sealing projection can prevent the part of the lubricant from entering between the axial end surface of the bush and the bush end surface abutting portion of the dust seal.

(3) According to the present invention, the sealing projection of the dust seal projects in a triangular shape in cross section from the radial inner section of the bush end surface abutting portion, and an angle ($\beta$) of the tip end portion relative to a straight line in parallel with an axial line of the connecting pin is set to be smaller than an angle ($\alpha$) of the tapered surface relative to the straight line ($\beta<\alpha$). Therefore, the tip end portion of the sealing projection can be abutted against the tapered surface of the chamfered portion side so as to be in close contact, enhancing sealing performance therebetween.

(4) In addition, according to the present invention, a ring having rigidity is embedded in the tubular fitting portion of the dust seal. Therefore, when the tubular fitting portion of the dust seal is fitted on the inner peripheral side of the boss member, the fitting force can be increased by the ring having rigidity to hold the tubular fitting portion to be in a pulling-out preventive state on the inner peripheral side of the boss member.

(5) Further, according to the present invention, the dust seal is formed by a flexible resin material having self-lubricating properties, which is made of ester urethane with high hardness, polyethylene, polyether ether ketone, polyimide, polyacetal, polyethylene terephthalate, polytetrafluoro-ethylene with filler therein or polyoxymethylene.

DESCRIPTION OF REFERENCE NUMERALS

Figure 1:
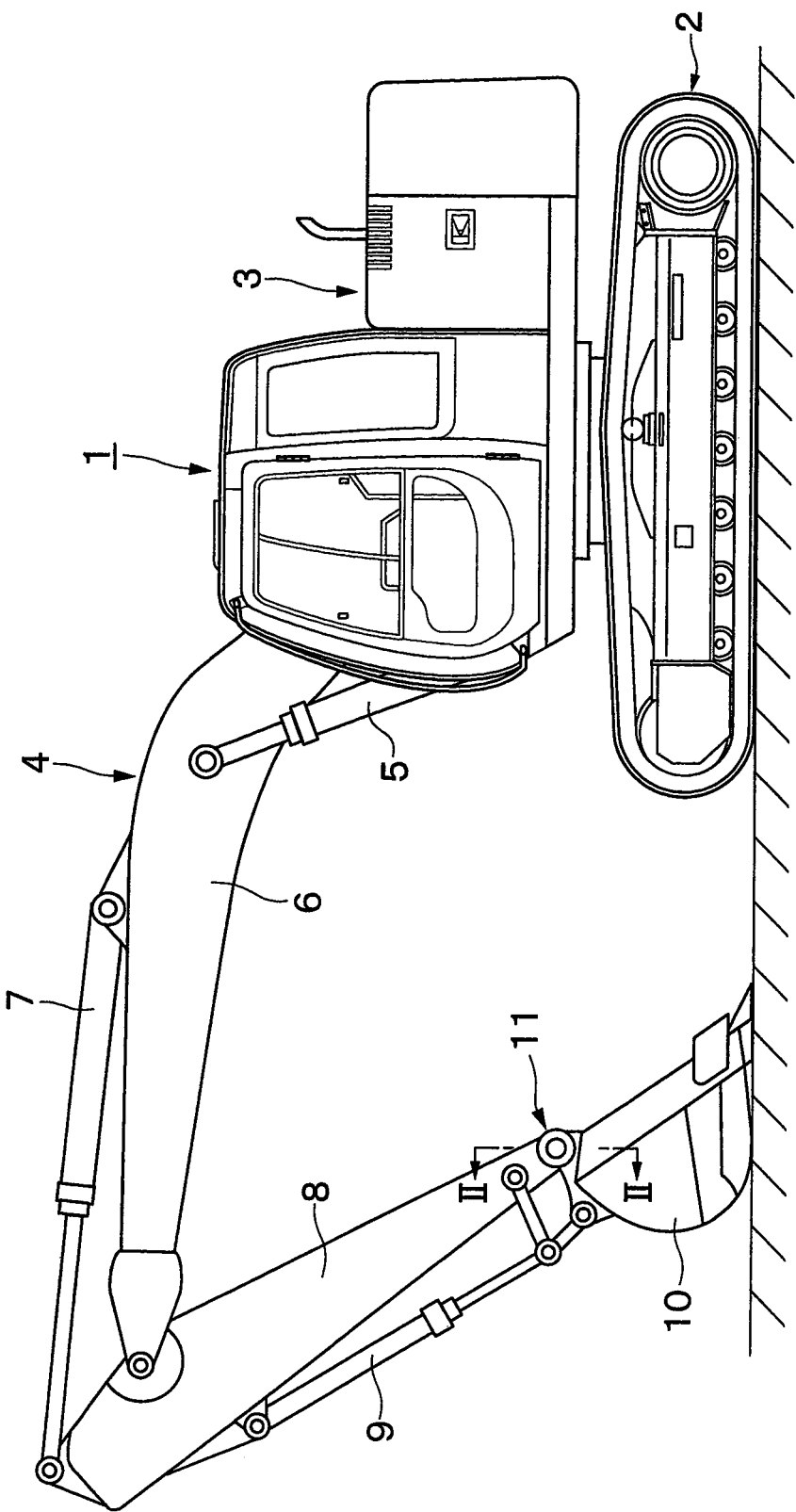
FIG. 1 is a front view showing a hydraulic excavator to which a bearing device according to a first embodiment of the present invention is applied.

11: Bearing device
12: Boss member
12A: Bush fitting bore
12B: Seal fitting bore
14: Bush
14A: Pin through hole
14D: End surface
14E: Chamfered portion
15, 16: Bracket (opponent member)
17: Connecting pin
20, 31: Dust seal
20A, 31A: Tubular fitting portion
20B, 31B: Bush end surface abutting portion
20D, 31D: Lip portion
20E, 31E: Sealing projection
32: Metal ring (ring)

BEST MODE OF CARRYING OUT THE INVENTION

Hereinafter, a case where a bearing device according to an embodiment in the present invention is applied to a connecting portion between an arm and a bucket of a working mechanism provided in a hydraulic excavator will be taken as an example, which will be in detail explained with reference to the accompanying drawings.

FIGS. 1 to 9 show a bearing device according to a first embodiment of the present invention. In the drawings, denoted at 1 is a hydraulic excavator as a representative example of a construction machine. The hydraulic excavator 1 is largely constituted by, for example, a lower traveling structure 2 of a crawler type, an upper revolving structure 3 swingably mounted on the lower traveling structure 2, and a working mechanism 4 liftably provided at the front portion side of the upper revolving structure 3. In this case, a vehicle body of the hydraulic excavator 1 is constituted by the lower traveling structure 2 and the upper revolving structure 3.

The working mechanism 4 is largely constituted by a boom 6 connected to the front portion side of the upper revolving structure 3 by a pin and lifted up and down by a boom cylinder 5, an arm 8 connected to a tip end side of the boom 6 by a pin and lifted up and down by an arm cylinder 7, and a bucket 10 as a working tool connected to a tip end side of the arm 8 by a pin and rotated by a bucket cylinder 9.

Here, among bearing devices provided in the respective pin connecting portions of the boom 6, the arm 8, the bucket 10, the boom cylinder 5, the arm cylinder 7 and the bucket cylinder 9, a bearing device 11 provided between the arm 8 and the bucket 10 will be in detail described as a representative example.

Namely, designated at 11 is, for example, the bearing device provided between the arm 8 and the bucket 10, and the bearing device 11 rotatably connects the bucket 10 to the tip end side of the arm 8 and is constituted by a boss member 12, a bush 14, brackets 15 and 16, a connecting pin 17, a dust seal 20 and the like, which will be described later.

Figure 2:
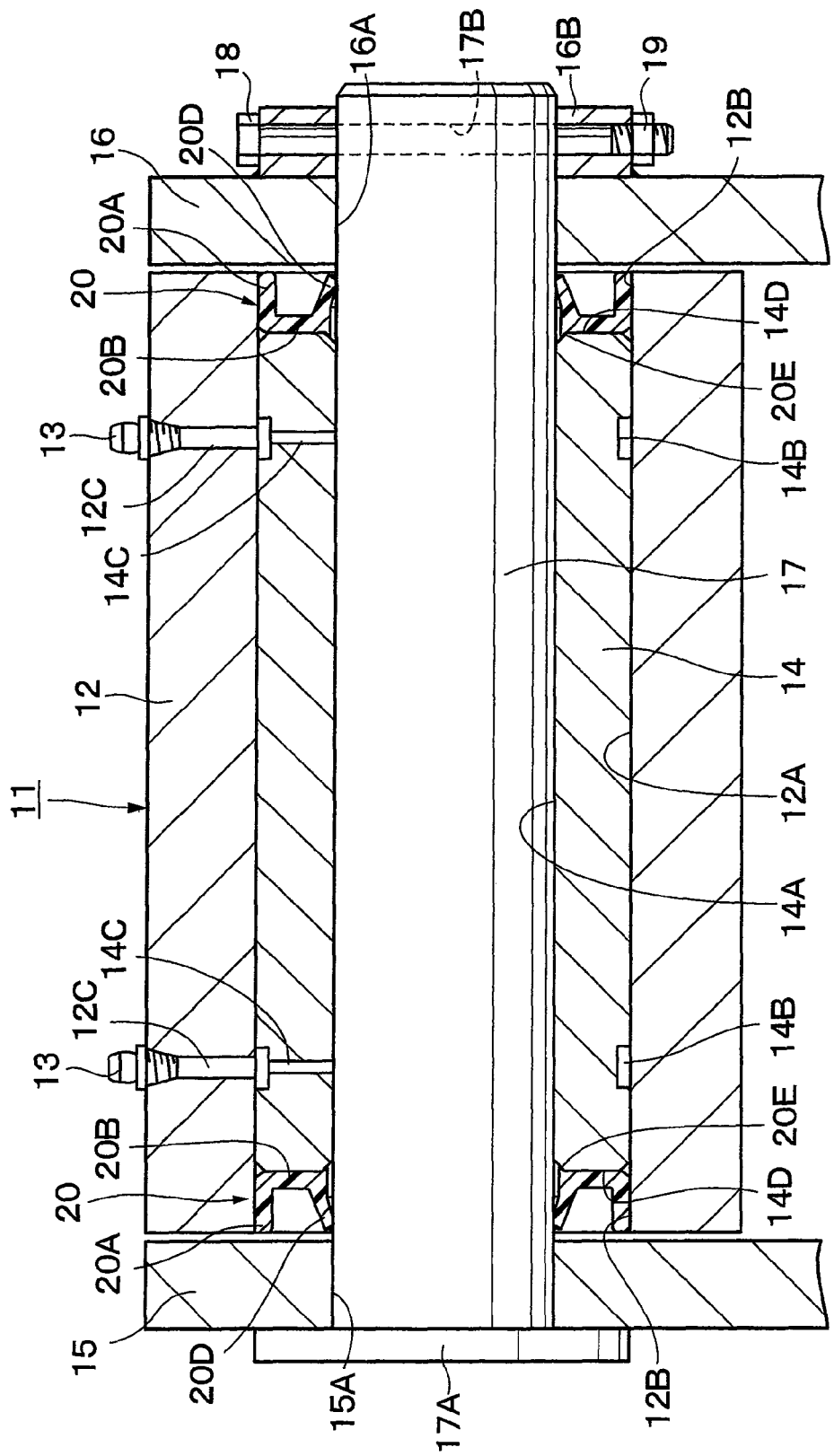
FIG. 2 is an enlarged sectional view showing the bearing device according to the first embodiment taken in the direction of arrows II-II in FIG. 1.

Indicated at 12 is the boss member provided at the tip end portion of the arm 8, and the boss member 12 is formed in a cylindrical shape by use of a steel pipe, for example. Here, the inner peripheral side of the boss member 12 is, as shown in FIG. 2, provided with a bush fitting bore 12A positioned in an axial intermediate section and fitting the bush 14 therein to be described later and seal fitting bores 12B positioned in both of axial end sides and fitting the dust seal 20 therein to be described later.

A bore diameter of the seal fitting bore 12B is formed to be equal to or slightly greater than that of the bush fitting bore 12A. Therefore, the bush 14 to be described later is fitted in the bush fitting bore 12A of the boss member 12 by applying a forcible force to the bush 14 from the side of the seal fitting bore 12B in an axial outside by means of press-fit, for example.

Figure 3:
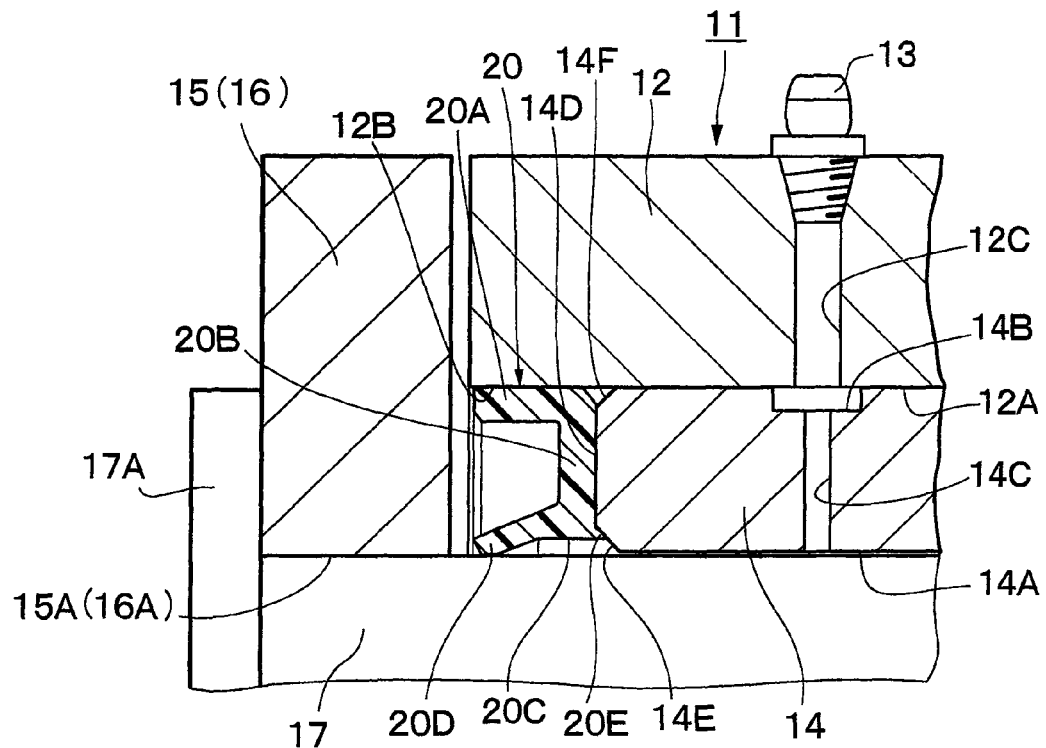
FIG. 3 is a partially sectional view in an enlarged form showing a boss member, a bush, a connecting pin, a dust seal and the like in FIG. 2.

Lubricant passages 12C are radially formed in the boss member 12 at the left and right sides in an axial direction for supplying lubricant such as grease in the boss member 12. Further, the lubricant passages 12C are closed by a lubricating agent supplying nipple 13 at an outer peripheral side of the boss member 12 as shown in FIGS. 2 and 3.

Designated at 14 is the cylindrical bush which is fitted in the bush fitting bore 12A of the boss member 12 by means of press-fit, for example. The inner peripheral side of the bush 14 is provided with a pin through hole 14A into which the connecting pin 17 to be described later is inserted. At both end sides of the bush 14, there are provided annularly recessed grooves 14B formed over an entire periphery of the bush 14 at outer peripheral sections corresponding to the lubricant passages 12C of the boss member 12 and lubricant passages 14C radially penetrating from the recessed grooves 14B toward the pin through hole 14A.

In consequence, the lubricant supplied from the lubricating agent supplying nipple 13 is supplied through the lubricant passage 12C of the boss member 12, and the recessed groove 14B and the lubricant passage 14C of the bush 14 toward a sliding surface between the pin through hole 14A of the bush 14 and the connecting pin 17 to be described later.

End surfaces 14D each formed of a ring-shaped flat surface are, as shown in FIGS. 2 to 6, provided at both of axial end sides of the bush 14, and the dust seal 20 (bush end surface abutting portion 20B) to be described later is located in such a manner as to face the end surface 14D. In addition, the radial inner side of the end surface 14D is provided with a chamfered portion 14E at the radial inner side composed of an annular tapered surface inclined obliquely at an angle of $\alpha$ (see FIG. 4). Further, the radial outer side of the end surface 14D is provided with a chamfered portion 14F at the radial outer side composed of an annular tapered surface inclined obliquely at an angle similar to that of the chamfered portion 14E.

The chamfered portion 14F in this case is formed in a tapered shape to serve as a guide surface at the time of pushing the bush 14 into the bush fitting bore 12A of the boss member 12 for fitting therein. The chamfered portion 14E at the radial inner side is also formed in a tapered shape to serve as a guide surface at the time of inserting the connecting pin 17 to be described later into the pin through hole 14A of the bush 14. Here, the chamfered portion 14E is formed as a tapered surface having an angle $\alpha$ (for example, $40°<\alpha<50°$, preferably) $\alpha=45°$).

Indicated at 15 and 16 are left and right brackets as opponent members provided integrally with the bucket 10, and the brackets 15 and 16 are arranged to sandwich the boss member 12 from both of the left and right sides. Pin through holes 15A and 16A are formed in the left and right brackets 15 and 16 to be coaxial with the bush fitting bore 12A of the boss member 12, and the connecting pin 17 to be described later is inserted into the pin through holes 15A and 16A.

Thereby, the left and right brackets 15 and 16 are connected rotatably relative to the boss member 12. A stationary ring 16B is, as shown in FIG. 2, fixed to an outer side surface of the right bracket 16 by welding means, and a bolt 18 to be described later is radially inserted into the stationary ring 16B.

Denoted at 17 is the connecting pin constituting a part of the bearing device 11, and a flange portion 17A having a larger diameter is attached to one end side of the connecting pin 17 in an axial direction and a bolt through hole 17B is formed in the other end side thereof to radially penetrate therethrough. In addition, the connecting pin 17 comprises the axial one end side inserted into the pin through hole 15A of the bracket 15, an axial intermediate section slidably inserted into the pin through hole 14A of the bush 14, and the axial other end side inserted into the pin through hole 16A of the bracket 16. Therefore, the connecting pin 17 rotatably connects the boss member 12 to the left and right brackets 15 and 16 therebetween.

Indicated at 18 is the bolt for preventing the connecting pin 17 from pulling out of the brackets. The bolt 18 is inserted through the stationary ring 16B of the bracket 16 into the bolt through hole 17B of the connecting pin 17 in a state where the flange portion 17A of the connecting pin 17 is abutted against the bracket 15, as shown in FIG. 2. In this state, a nut 19 is threaded into the tip end side of the bolt 18, and thereby the bolt 18 is to hold the connecting pin 17 to the brackets 15 and 16 in a pulling-out preventive state and in a rotation preventive state.

Figure 7:
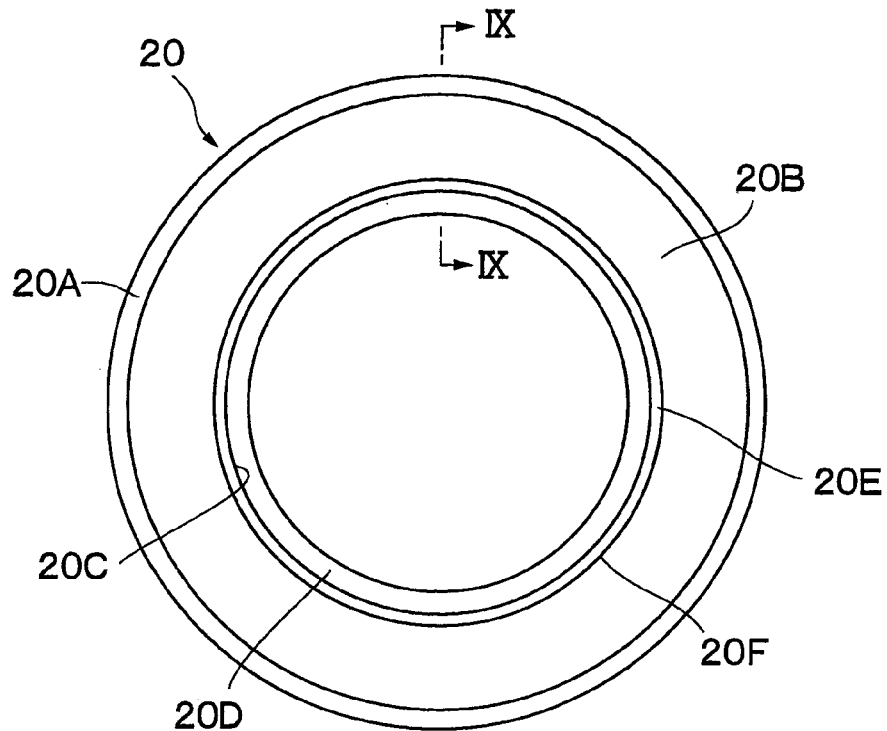
FIG. 7 is an enlarged side view showing the dust seal in FIG. 4 as viewed from a bush end surface abutting portion side.
Figure 8:
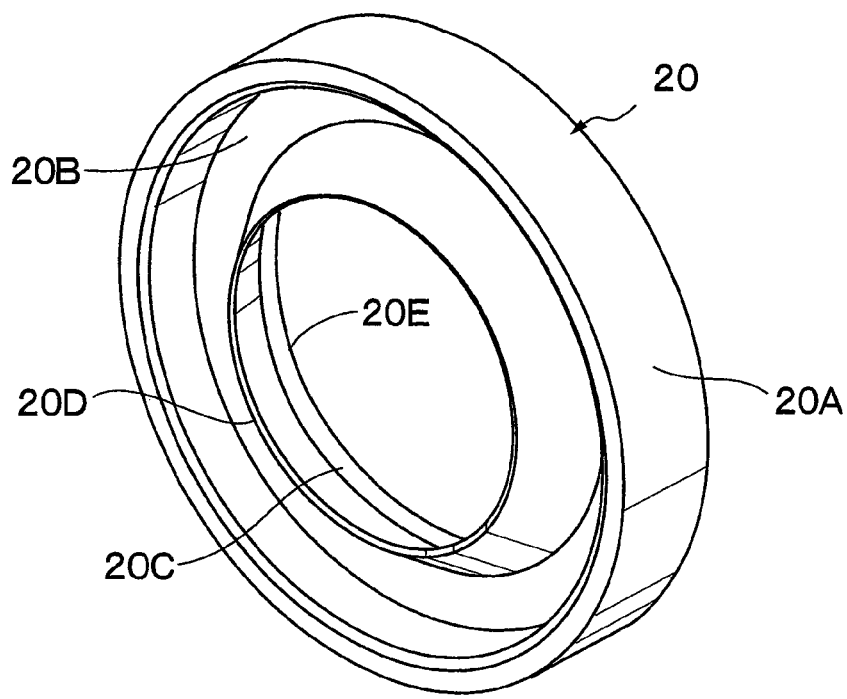
FIG. 8 is a perspective view showing the dust seal in FIG. 7 as viewed from a back side.

Designated at 20 are the dust seals provided between the boss member 12 and the connecting pin 17 to be positioned at both of the axial end sides of the bush 14. The dust seal 20 prevents foreign objects (for example, dust and rain water) from entering between the pin through hole 14A of the bush 14 and the outer peripheral surface of the connecting pin 17 to protect sliding surfaces of the both from the foreign objects. The dust seal 20 is, as shown in FIGS. 7 to 9, formed as a ring body having a U-shape in cross section.

Figure 4:
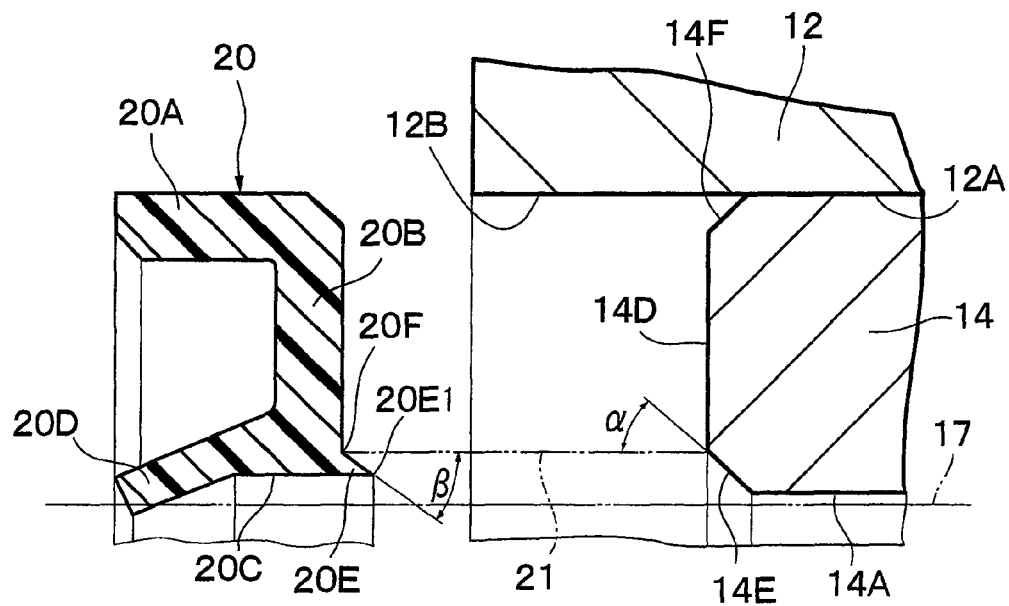
FIG. 4 is an enlarged sectional view of essential portions showing a state before mounting the dust seal on an inner peripheral side of the boss member.

Here, as shown in FIGS. 3 and 4, the dust seal 20 comprises a tubular fitting portion 20A fitted in the seal fitting bore 12B of the boss member 12 with an interference, an annular bush end surface abutting portion 20B extending radially inward from the tubular fitting portion 20A toward the connecting pin 17 to abut against the end surface 14D of the bush 14 in a state of surface contact, a tubular surface 20C formed having a uniform inner diameter to be positioned radially inward of the bush end surface abutting portion 20B, a lip portion 20D extending to be inclined obliquely to be gradually reduced in diameter from the radial inner sections of the bush end surface abutting portion 20B and the tubular surface 20C toward an axially opposite side to the bush 14, that is, toward the brackets 15 and 16 side, and having a tip end portion as the minimum diameter section sliding on the outer peripheral surface of the connecting pin 17 with appropriate flexibility, and a sealing projection 20E to be described later.

Figure 9:
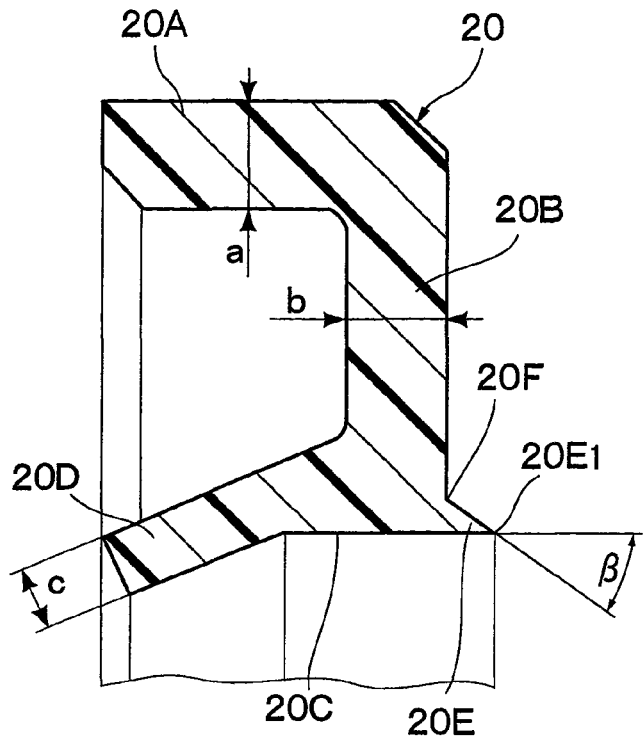
FIG. 9 is an enlarged sectional view showing the dust seal taken in the direction of arrows IX-IX in FIG. 7.

Namely, in the dust seal 20, the sealing projection 20E projecting in a triangular shape in cross section from the radial inner section of the bush end surface abutting portion 20B is formed integrally with the bush end surface abutting portion 20B, as shown in FIGS. 4 and 9. The sealing projection 20E projects from the tubular surface 20C having a uniform inner diameter in an axially opposite direction to the lip portion 20D. The sealing projection 20E has a tip end portion 20E1 forming a sharp angle of a triangle in cross section, and an angle $\beta$ of the tip end portion 20E1 relative to an imaginary line 21 to be described later is set to be smaller than an angle $\alpha$ of the chamfered portion 14E ($\beta<\alpha$).

In this case, the angle $\alpha$ of the chamfered portion 14E formed at the end surface 14D side of the bush 14 is set in a range of $40°<\alpha<50°$, and preferably the chamfered portion 14E is formed as a tapered surface of 45° ($\alpha=45°$). On the other hand, an angle $\beta$ of the sealing projection 20E relative to the imaginary line 21 is set to be preferably, for example, larger than 30° and smaller than an angle $\alpha$ ($30°<\beta<\alpha$). Specifically in a case where the angle $\alpha$ of the chamfered portion 14E is equal to 45°, the angle $\beta$ of the sealing projection 20E is set in a range of $30°<\beta<45°$. It should be noted that when the angle $\beta$ of the sealing projection 20E is reduced to 30° or less, the sealing projection 20E becomes thin in thickness to lead to a reduction in strength, increasing a possibility of earlier damage or break occurrence.

Further, the dust seal 20 has a boundary portion 20F composed of a sharp angular portion between a base end of the sealing projection 20E and the bush end surface abutting portion 20B. The boundary portion 20F is, as shown in FIG. 4, formed having a radial dimension similar to the boundary position (similar height position) between the end surface 14D of the bush 14 and the chamfered portion 14E. That is, the boundary portion 20F is arranged on the imaginary line 21 shown in a two-dot chain line in FIGS. 4 and 9.

Here, the imaginary line 21 is formed of a straight line (straight line in parallel with an axial line) connecting the boundary position between the end surface 14D of the bush 14 and the chamfered portion 14E to the boundary portion 20F of the dust seal 20, and for example, is defined as an axial line of the connecting pin 17 or a straight line in parallel with the uniform tubular surface 20C of the dust seal 20.

Figure 5:
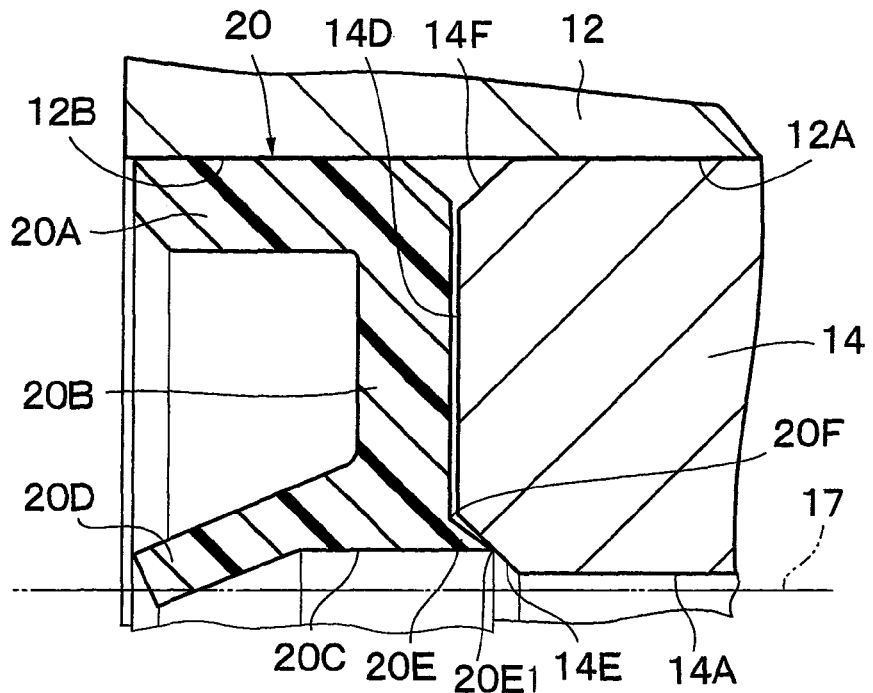
FIG. 5 is an enlarged sectional view of essential portions similar to FIG. 4 showing a state in the middle of fitting the dust seal on the inner peripheral side of the boss member.

When the tubular fitting portion 20A of the dust seal 20 is fitted in the seal fitting bore 12B of the boss member 12 and the bush end surface abutting portion 20B faces the end surface 14D of the bush 14, the bush end surface abutting portion 20B overlaps the end surface 14D of the bush 14 in a state where the tip end portion 20E1 of the sealing projection 20E is firstly in contact with the chamfered portion 14E of the bush 14, as shown in FIG. 5.

Figure 6:
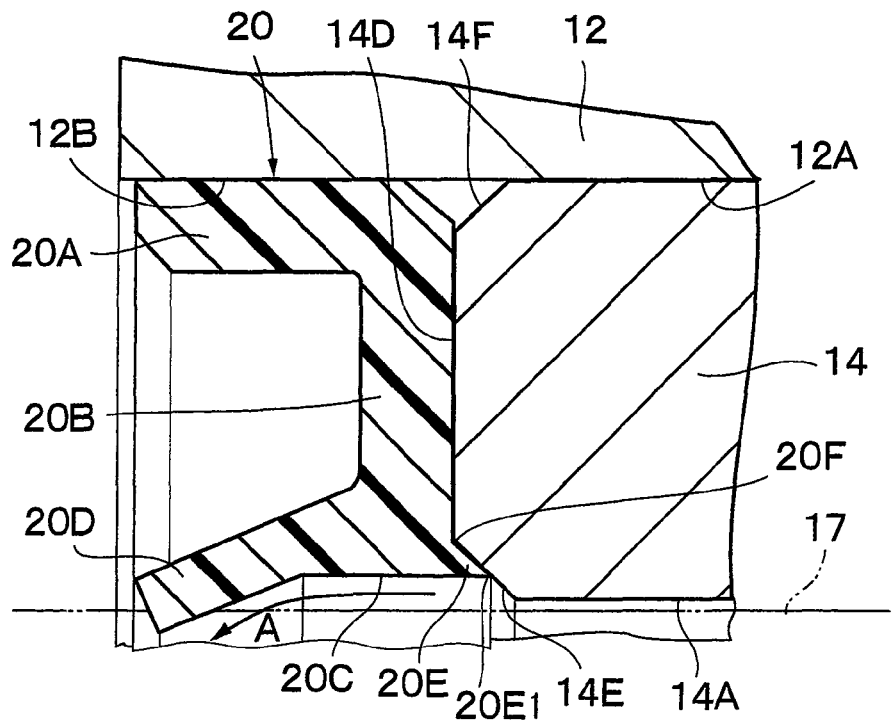
FIG. 6 is an enlarged sectional view of essential portions similar to FIG. 5 showing an assembling state of fitting the dust seal on the inner peripheral side of the boss member.

Next, at the time of further pressing the dust seal 20 into the boss member 12 from this state, as shown in FIG. 6, the bush end surface abutting portion 20B of the dust seal 20 abuts against the end surface 14D of the bush 14 to produce a surface contact therebetween. At this time, the sealing projection 20E abuts against the chamfered portion 14E of the bush 14 to overlap the chamfered portion 14E, that is, to cover a part of the chamfered portion 14E.

Therefore, the sealing projection 20E prevents a part of the lubricant to be described later from leaking from the side of the chamfered portion 14E of the bush 14 to enter between the end surface 14D and the bush end surface abutting portion 20B, thereby maintaining a sealed state between the end surface 14D of the bush 14 and the bush end surface abutting portion 20B of the dust seal 20.

The dust seal 20 is formed by use of a flexible resin material having self-lubricating properties, which is made of ester urethane with high hardness, polyethylene, polyether ether ketone, polyimide, polyacetal, polyethylene terephthalate (PET), polytetrafluoro-ethylene with filler therein (PTFE), polyoxymethylene (POM) or the like. The flexible resin material is harder in material quality and higher in strength than a soft resin material such as synthetic rubber.

Further, in the dust seal 20, as shown in FIG. 9, a dimension a of a thickness of the tubular fitting portion 20A is set, for example, in a range of 1.8 to 2.2 mm (1.8 mm≤a≤2.2 mm), preferably a is set to be equal to 2 mm or thereabouts. A dimension b of a thickness of the bush end surface abutting portion 20B is set, for example, approximately in a range of 1.8 mm≤b≤2.2 mm, preferably b is set to be equal to 2 mm or thereabouts. Further, a dimension c of a thickness of the lip portion 20D is set, for example, approximately in a range of 1.3 mm≤c≤1.7 mm, preferably c is set to be equal to 1.5 mm or thereabouts.

The hydraulic excavator 1 according to the present embodiment is configured as described above, and an operation thereof at the time of performing a ground excavating operation with an operation of the hydraulic excavator 1 will be explained.

An operator gets in a cab of the upper revolving structure 3 and operates an operation lever for traveling provided in the cab, thereby making it possible to drive a crawler of the lower traveling structure 2 to carry forward or backward the hydraulic excavator 1. An operation lever for working can be operated for tilting up and down the working mechanism 4 to perform a ground excavating operation of earth and sand or the like.

In operating the bucket 10 in the working mechanism 4, the bucket cylinder 9 can be extended and contracted to rotate the bucket 10 around the connecting pin 17 in the bearing device 11 at the tip end side of the arm 8. At this time, the dust seal 20 provided between the boss member 12 and the connecting pin 17 acts to prevent foreign objects such as dust (earth and sand), water and the like from entering into the sliding surface between the pin through hole 14A of the bush 14 and the connecting pin 17.

In this case, the tubular fitting portion 20A of the dust seal 20 is formed in advance to have a diameter greater than that of the seal fitting bore 12B of the boss member 12 and is fitted in the seal fitting bore 12B with an interference. At this time, the bush end surface abutting portion 20B is abutted against the end surface 14D of the bush 14 in a flexible deformable state. The lip portion 20D of the dust seal 20 has the tip end side which is in sliding contact with the outer peripheral surface of the connecting pin 17 with an appropriate flexibility to prevent the foreign objects from entering between the pin through hole 14A of the bush 14 and the outer peripheral surface of the connecting pin 17 from an outside.

Incidentally, at the time of first assembling the bearing device 11 or at the time of a maintenance work such as performing maintenance, check or the like, the lubricant such as grease is supplied from the lubricating agent supplying nipple 13. At this time, the lubricant is supplied through the lubricant passage 12C of the boss member 12, and the recessed groove 14B and the lubricant passage 14C of the bush 14 toward the sliding surface between the pin through hole 14A and the connecting pin 17. However, the lubricant supplied between the bush 14 and the connecting pin 17 in the bearing device 11 has a possibility of partially leaking along the outer peripheral surface of the connecting pin 17 to an axial outside and entering between the bush end surface abutting portion 20B of the dust seal 20 and the end surface 14D of the bush 14.

If a part of the lubricant enters into the bush end surface abutting portion 20B of the dust seal 20, a pressing force by a lubricating agent supplying pressure caused by a lubricating agent supplying operation of the lubricant is supposed to be applied on the dust seal 20 in such a direction that the dust seal 20 is pulled away from the end surface 14D of the bush 14 (direction of being closer to the brackets 15 and 16). In this way, caused by the pressing force received from the lubricant, the dust seal 20 has a possibility of partially pulling out from the seal fitting bore 12B of the boss member 12.

Therefore, according to the present embodiment, the dust seal 20 is provided with the sealing projection 20E formed integrally, and the sealing projection 20E projects in an opposite direction to the lip portion 20D from the radial inner section of the bush end surface abutting portion 20B to abut against the chamfered portion 14E of the bush 14 in such a manner as to overlap the chamfered portion. In this case, the sealing projection 20E projects inward in a triangle shape in cross section from the radial inner section (position of the boundary portion 20F) of the bush end surface abutting portion 20B, and an angle β of the tip end portion 20E1 is set to be smaller than an angle α of the chamfered portion 14E ($\beta < \alpha$).

In consequence, in a case of mounting the dust seal 20 in the seal fitting bore 12B of the boss member 12, when the bush end surface abutting portion 20B is in a halfway state of having a face-face relation with the end surface 14D of the bush 14 as shown in FIG. 5, the tip end portion 20E1 of the sealing projection 20E first gets in contact with the chamfered portion 14E of the bush 14. Thereafter, on an assembling stage of strongly pressing down the dust seal 20 into the boss member 12, the bush end surface abutting portion 20B of the dust seal 20 abuts against the end surface 14D of the bush 14 so as to contact wide surface area therebetween, as shown in FIG. 6. At this time, the sealing projection 20E can abut against the chamfered portion 14E of the bush 14 to make the entire sealing portion 20E overlap the chamfered portion 14E, that is, to cover the chamfered portion 14E.

As a result, when the lubricant such as grease is supplied from the lubricating agent supplying nipple 13, even if a part of the lubricant supplied between the bush 14 and the connecting pin 17 leaks along the outer peripheral surface of the connecting pin 17 to the axial outside (the chamfered portion 14E side), the sealing projection 20E can prevent the leaked lubricant from entering between the bush end surface abutting portion 20B of the dust seal 20 and the end surface 14D of the bush 14. Therefore, a sealed state between the end surface 14D of the bush 14 and the bush end surface abutting portion 20B of the dust seal 20 can be maintained.

Thus providing the sealing projection 20E prevents the lubricant supplied between the bush 14 and the connecting pin 17 from entering into the chamfered portion 14E. Therefore, the lubricant flows along the tubular surface 20C in the direction of an arrow A in FIG. 6, and a part of the lubricant pushes up the lip portion 20D to a radial outer side such that it is flexibly deformed, and therefore is discharged as extra oil outside of the lip portion 20D.

Accordingly, in the present embodiment, by providing the dust seal 20 with the sealing projection 20E, it is possible to suppress the pressing force of the lubricant supplied from the outside to be applied on the region between the end surface 14D of the bush 14 and the bush end surface abutting portion 20B of the dust seal 20, thereby holding the dust seal 20 in a stable posture in the seal fitting bore 12B of the boss member 12. The sealing projection 20E of the dust seal 20 can maintain a sealed state between the end surface 14D of the bush 14 and the bush end surface abutting portion 20B of the dust seal 20, preventing the pulling-out of the dust seal 20 by the lubricating agent supplying pressure.

Therefore, it is not necessary to add and provide a special pulling-out preventive portion or the like on the outer peripheral side of the tubular fitting portion 20A of the dust seal 20 as in the case of the conventional art, for example, Patent Literature 1 as described above. In consequence, molding, processing and the like of the dust seal 20 can be facilitated to achieve an improvement on productivity, a reduction in manufacturing cost and the like.

The dust seal 20 comprising the tubular fitting portion 20A, the bush end surface abutting portion 20B, the lip portion 20D, the sealing projection 20E as mentioned above and the like can be formed by a flexible resin material having self-lubricating properties, which is made of ester urethane with high hardness, polyethylene, polyether ether ketone, polyimide, polyacetal, polyethylene terephthalate (PET), polytetrafluoro-ethylene with filler therein (PTFE), polyoxymethylene (POM) or the like.

Since the above flexible resin material has the self-lubricating properties, it can compensate for low-friction sliding of the lip portion 20D of the dust seal 20 on the outer peripheral surface of the connecting pin 17 to suppress wear and damage of the lip portion 20D for a long period of time. Since the flexible resin material adopts a resin material which is harder in material quality and higher in strength as compared to a soft resin material such as synthetic rubber, it can enhance durability and lifetime as the dust seal 20, and achieve a stable sealing effect for a long period of time.

The sealing projection 20E of the dust seal 20 abuts against the chamfered portion 14E in such a manner as to overlap the chamfered portion 14E in a state where the tip end portion 20E1 is firstly in contact with the chamfered portion 14E of the bush 14. As a result, the tip end portion 20E1 of the sealing projection 20E can abut against the chamfered portion 14E as the tapered surface like a so-called lip, and therefore the abutting surface between the chamfered portion 14E and the sealing projection 20E can be maintained in a sealed state.

Further, at the time of forming the chamfered portion 14E as an inclined surface having an angle α, an angle β of the tip end portion 20E1 of the sealing projection 20E is set to be, for example, larger than 30° and smaller than angle α ($30° < \beta < \alpha$). Therefore, as shown in FIGS. 5 and 6, the tip end portion 20E1 of the sealing projection 20E can be abutted against the tapered surface of the chamfered portion 14E so as to be in close contact, enhancing sealing performance therebetween. Further, since the sealing projection 20E can be formed integrally as a part of the dust seal 20, the sealing projection 20E can be easily provided in the dust seal 20, thus achieving an improvement on productivity, a reduction in manufacturing cost and the like.

Figure 10:
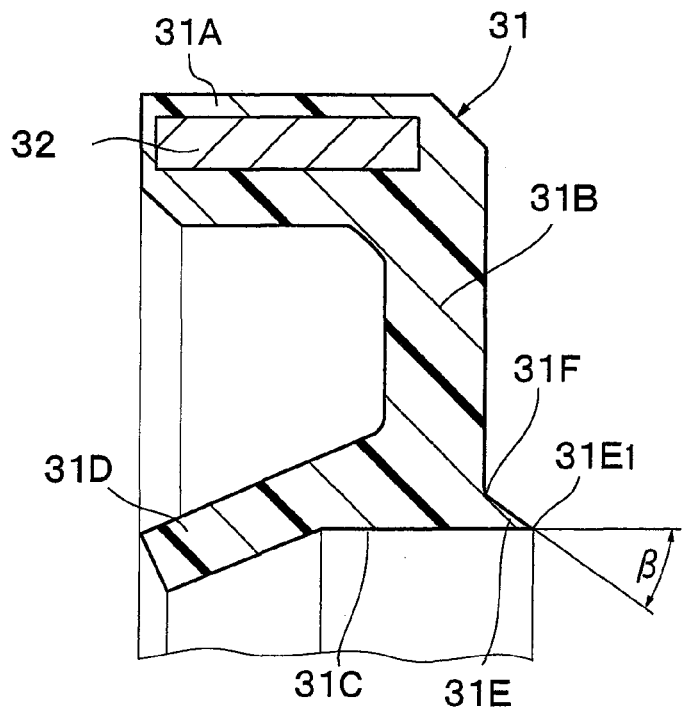
FIG. 10 is an enlarged sectional view similar to FIG. 9 showing a dust seal according to a second embodiment.

Next, FIG. 10 shows a second embodiment in the present invention. This second embodiment has a feature in that a ring having rigidity is embedded in a tubular fitting portion of a dust seal. In the following description of the second embodiment, those component parts which are identical to counterparts in the foregoing first embodiment are simply designated by the same reference numerals to avoid repetitions of similar explanations.

In the drawing, denoted at 31 is a dust seal adopted in the second embodiment. The dust seal 31 is configured substantially in the same way with the dust seal 20 described in the first embodiment and comprises a tubular fitting portion 31A, a bush end surface abutting portion 31B, a tubular surface 31C, a lip portion 31D, a sealing projection 31E having a tip end portion 31E1, and a boundary portion 31F. However, the dust seal 31 in the second embodiment differs from the dust seal 20 in the first embodiment in that a metal ring 32 to be described later is embedded in the tubular fitting portion 31A.

Denoted at 32 is the metal ring constituting a ring having rigidity, and the metal ring 32 is formed by a metallic ring extending over an entire periphery of the dust seal 31. The metal ring 32 is, as shown in FIG. 10, embedded in the tubular fitting portion 31A of the dust seal 31 and the periphery of the metal ring 32 is completely covered with a resin material forming the tubular fitting portion 31A.

Therefore, the tubular fitting portion 31A of the dust seal 31 is formed to be thicker by the thickness of the metal ring 32 than the tubular fitting portion 20A of the dust seal 20 mentioned in the first embodiment. The metal ring 32 made of a rigid body, at the time of fitting the tubular fitting portion 31A of the dust seal 31 in the seal fitting bore 12B of the boss member 12, has a function of increasing the fitting force, therefore holding the tubular fitting portion 31A to be in a pulling-out preventive state in the seal fitting bore 12B of the boss member 12.

In the second embodiment as thus configured, the sealing projection 31E projecting in an opposite direction to the lip portion 31D from the radial inner section of the bush end surface abutting portion 31B of the dust seal 31 is formed to be integral with the bush end surface abutting portion 31B. Therefore, the sealing projection 31E can abut against the chamfered portion 14E of the bush 14 to overlap the chamfered portion 14E, that is, to cover the chamfered portion 14E, obtaining an operational effect substantially similar to that of the first embodiment described above.

Further, the second embodiment is configured such that the metal ring 32 is embedded in the tubular fitting portion 31A of the dust seal 31 as shown in FIG. 10. Therefore, when the dust seal 31 is fitted in the seal fitting bore 12B of the boss member 12, the fitting force of the tubular fitting portion 31A of the dust seal 31 can be securely increased by the metal ring 32 to hold the tubular fitting portion 31A to be in a pulling-out preventive state in the seal fitting bore 12B of the boss member 12.

It should be noted that in the first embodiment, a description has been given by citing as an example a case where the thickness dimension a of the tubular fitting portion 20A of the dust seal 20 is formed in a range of, for example, 1.8 mm≤a≤2.2 mm. However, the present invention is not limited to this particular example. For example, the tubular fitting portion may be formed such that the thickness dimension a is set to be less than 1.8 mm or greater than 2.2 mm. This also applies similarly to the thickness dimension b of the bush end surface abutting portion 20B.

In addition, in the first embodiment, a description has been given by citing as an example a case where the thickness dimension c of the lip portion 20D is formed in a range of, for example, 1.3 mm≤c≤1.7 mm. However, the present invention is not limited to this particular example. For example, the lip portion of the dust seal may be formed such that the thickness dimension c is set to be less than 1.3 mm or greater than 1.8 mm.

Namely, dimensions of the tubular fitting portion 20A, the bush end surface abutting portion 20B, and the lip portion 20D in the dust seal 20 and the like adopted in the first embodiment may be set as needed based upon conditions regarding designs of outer diameter dimensions, an arrangement space and the like of the boss member 12, the connecting pin 17 and the like, and are not limited to the aforementioned numerical values. This also applies similarly to the dust seal 31 described in the second embodiment.

In addition, in each of the embodiments, a case where the bearing device 11 is applied to the pin connecting portion between the arm 8 and the bucket 10 is explained as an example. However, the present invention is not limited to this particular example. For example, the bearing device may be applied to a pin connecting portion between a tip end of the boom 6 and the arm 8 constituting the working mechanism 4, a pin connecting portion between a foot portion of the boom 6 and the upper revolving structure 3, a pin connecting portion of each cylinder 5, 7, and 9, and the like.

Further, in each of the embodiments, a case where the bearing device 11 is applied to the hydraulic excavator 1 is explained as an example. However, the present invention is not limited to this particular example, and may be widely applied to other construction machines such as a hydraulic crane and a lift truck.

The invention claimed is:

1. A bearing device comprising:
   a tubular boss member including an inner peripheral side and first and second axial ends;
   a bush configured to fit on said inner peripheral side of said tubular boss member, said bush including first and second axial ends;
   a connecting pin inserted through an inner peripheral side of said bush to rotatably connect said tubular boss member to an opponent member; and
   a first dust seal positioned between said first axial end of said tubular boss member and said connecting pin, and a second dust seal positioned between said second axial end of said tubular boss member and said connecting pin;
   a chamfered portion formed in each of said axial ends of said bush and positioned at an inner peripheral side of each of said axial ends of said bush, each of said chamfered portions serving as a guide surface during insertion of said connecting pin into said bush, characterized in that:
   each of said dust seals is composed of;
   a tubular fitting portion fitted on the inner peripheral side of said tubular boss member with an interference fit;
   an annular bush end surface abutting portion extending radially inward from an axial inner end portion of said tubular fitting portion to abut against one of said axial ends of said bush with surface contact between said annular bush end surface abutting portion and said axial end of said bush;
   a radial inner tubular surface positioned radially inwardly of said annular bush end surface abutting portion;
   a lip portion extending inclined obliquely, in an axial direction of said connecting pin, from said radial inner tubular surface, said lip portion having a tip end side in sliding contact with an outer peripheral surface of said connection pin;

a sealing projection extending in said axial direction of said connecting pin and opposite to said lip portion from said radial inner tubular surface to abut against said chamfered portion of said bush and to overlap said chamfered portion, said sealing projection being positioned out of contact with said connecting pin, said sealing projection including a sealing projection abutting surface positionable adjacent said chamfered portion in said one of said axial ends of said bush, said sealing projection abutting surface, in a sealed state, overlapping and contacting said chamfered portion in said one of said axial ends of said bush in a position where a sealing projection tip end portion of said sealing projection is initially placed in contact with said chamfered portion of said bush, and wherein said sealing projection abutting surface suppresses lubricant from entering between said axial end of said bush and said annular bush end surface abutting portion of said dust seal and suppresses the lubricant from applying an axial pressing force between said annular bush end surface abutting portion of said dust seal and said axial end of said bush.

2. The bearing device according to claim 1, wherein said chamfered portion of each end of said bush has a tapered surface which is inclined at a predetermined angle ($\alpha$) and said sealing projection of said dust seal abuts against said tapered surface to overlap said tapered surface when said sealing projection tip end portion of said sealing projection is in contact with said tapered surface.

3. The bearing device according to claim 2, wherein a ring having rigidity is embedded in said tubular fitting portion of each of said dust seals.

4. The bearing device according to claim 2, wherein each of said dust seals is formed of a flexible resin material having self-lubricating properties, and which flexible resin material is one of ester urethane, polyethylene, polyether ether ketone, polyimide, polyacetal, polyethylene terephthalate, polytetrafluoro-ethylene with filler therein and polyoxymethylene.

5. The bearing device according to claim 2, wherein said sealing projection of each of said dust seals has a triangular shape in cross section and projects from said radial inner tubular surface of said annular bush end surface abutting portion, and wherein an angle ($\beta$) of said sealing projection tip end portion, relative to a straight line parallel with an axial line of said connecting pin, is smaller than an angle ($\alpha$) of said tapered surface relative to said straight line ($\beta<\alpha$).

6. The bearing device according to claim 5, wherein a ring having rigidity is embedded in said tubular fitting portion of each of said dust seals.

7. The bearing device according to claim 5, wherein each of said dust seals is formed of a flexible resin material having self-lubricating properties, which flexible resin material is one of ester urethane, polyethylene, polyether ether ketone, polyimide, polyacetal, polyethylene terephthalate, polytetrafluoro-ethylene with filler therein and polyoxymethylene.

8. The bearing device according to claim 1, wherein a ring having rigidity is embedded in said tubular fitting portion of each of said dust seals.

9. The bearing device according to claim 1, wherein each of said dust seals is formed of a flexible resin material having self-lubricating properties, and which flexible resin material is one of ester urethane, polyethylene, polyether ether ketone, polyimide, polyacetal, polyethylene terephthalate, polytetrafluoro-ethylene with filler therein and polyoxymethylene.

* * * * *